United States Patent
Gavin et al.

(10) Patent No.: US 9,145,818 B2
(45) Date of Patent: Sep. 29, 2015

(54) EXHAUST GAS SAMPLING DEVICE

(71) Applicant: DEERE & COMPANY, Moline, IL (US)

(72) Inventors: William F. Gavin, Waterloo, IA (US); Danan Dou, Cedar Falls, IA (US); Colton J. Salyards, New Hartford, IA (US)

(73) Assignee: DEERE & COMPANY, Moline, IL (US)

( * ) Notice: Subject to any disclaimer, the term of this patent is extended or adjusted under 35 U.S.C. 154(b) by 167 days.

(21) Appl. No.: 13/916,181

(22) Filed: Jun. 12, 2013

(65) Prior Publication Data

US 2014/0366510 A1 Dec. 18, 2014

(51) Int. Cl.
| | |
|---|---|
| *G01M 15/10* | (2006.01) |
| *F01N 11/00* | (2006.01) |
| *F01N 3/20* | (2006.01) |
| *F01N 13/00* | (2010.01) |
| *F01N 3/10* | (2006.01) |

(52) U.S. Cl.
CPC ............... *F01N 11/00* (2013.01); *F01N 3/106* (2013.01); *F01N 3/2066* (2013.01); *F01N 13/008* (2013.01); *F01N 13/0097* (2014.06); *F01N 2550/06* (2013.01); *F01N 2550/10* (2013.01); *F01N 2560/021* (2013.01); *F01N 2560/026* (2013.01); *Y02T 10/24* (2013.01)

(58) Field of Classification Search
CPC . F01N 11/00; F01N 2550/06; F01N 2550/10; F01N 2560/021; G01M 15/10
USPC ............... 73/114.69, 114.71, 114.72, 114.73, 73/114.75
See application file for complete search history.

(56) References Cited

U.S. PATENT DOCUMENTS

| | | | |
|---|---|---|---|
| 7,263,823 | B2 | 9/2007 | Andrews et al. |
| 7,644,576 | B2 * | 1/2010 | Inagaki et al. ........... 60/276 |
| 8,245,497 | B2 | 8/2012 | Yoda et al. |
| 8,256,205 | B2 | 9/2012 | Weber |
| 2006/0236677 | A1 * | 10/2006 | Inagaki et al. .......... 60/276 |
| 2009/0120069 | A1 * | 5/2009 | Nagaoka et al. ........ 60/286 |
| 2010/0115919 | A1 | 5/2010 | Yoda et al. |
| 2010/0132340 | A1 | 6/2010 | Sano et al. |
| 2010/0257846 | A1 | 10/2010 | Weber |
| 2012/0151999 | A1 * | 6/2012 | Seybold et al. .......... 73/49.8 |
| 2012/0233986 | A1 | 9/2012 | Geveci et al. |

OTHER PUBLICATIONS

European Search Report issued in counterpart application No. 14172198.5, dated Sep. 1, 2014 (8 pages).

* cited by examiner

*Primary Examiner* — Eric S McCall

(57) ABSTRACT

An exhaust gas sampling device coupled to an aftertreatment system for treating exhaust gas flowing therethrough. The exhaust gas sampling device comprises an inlet passage, an outlet passage, a sensor passage, and a sensor. The inlet passage extracts a portion of the exhaust gas from the aftertreatment system, and the portion of the exhaust gas has a physical property that that is substantially similar to an equivalent physical property of a cross section of the exhaust gas flowing through the aftertreatment system. The sensor passage is positioned fluidly between the inlet passage and the outlet passage, and the sensor is in fluid communication with the sensor passage for providing a signal indicative of a property of the portion of the exhaust gas. The outlet passage reintroduces the portion of the exhaust gas back into the aftertreatment system.

19 Claims, 4 Drawing Sheets

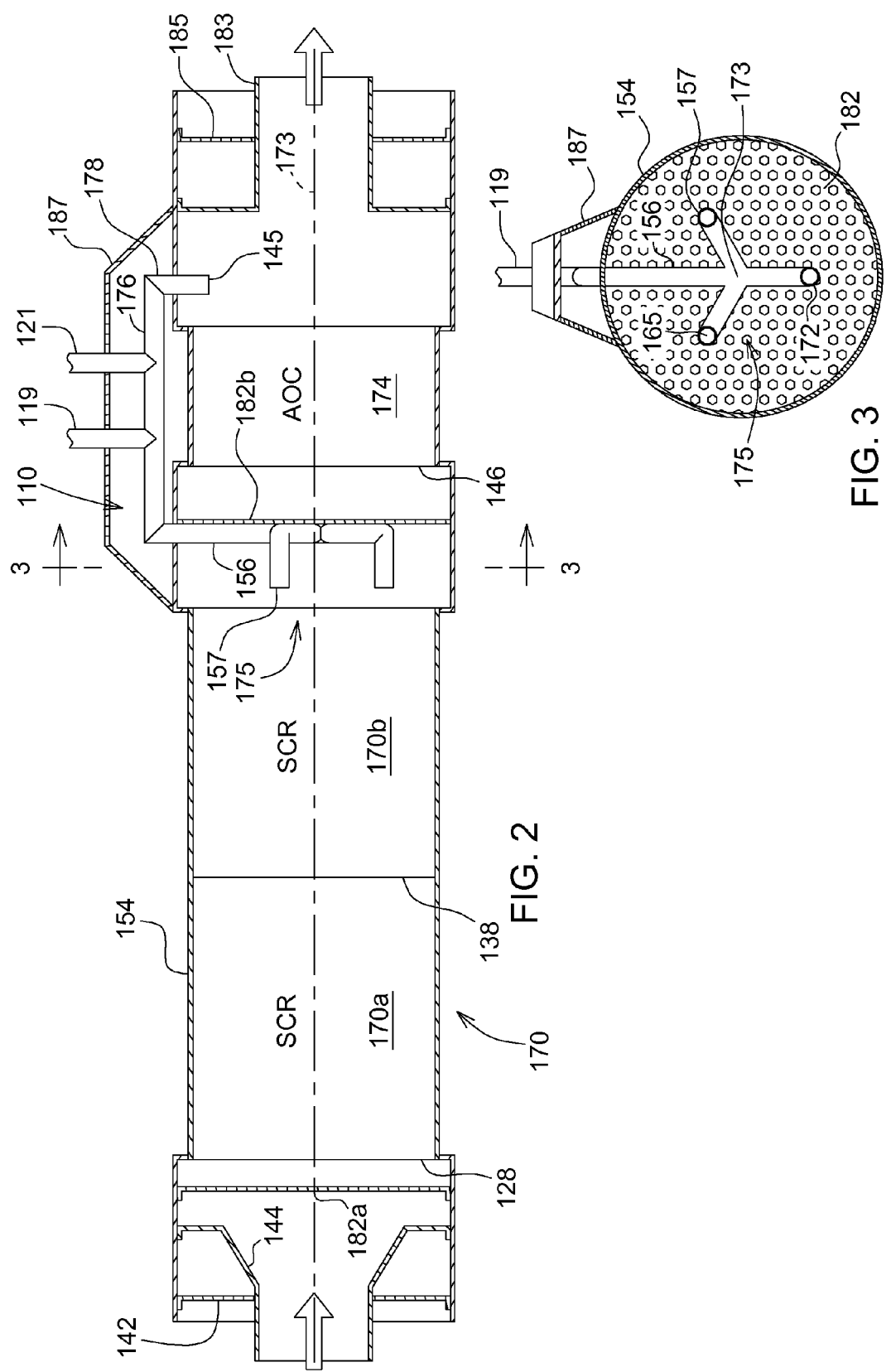

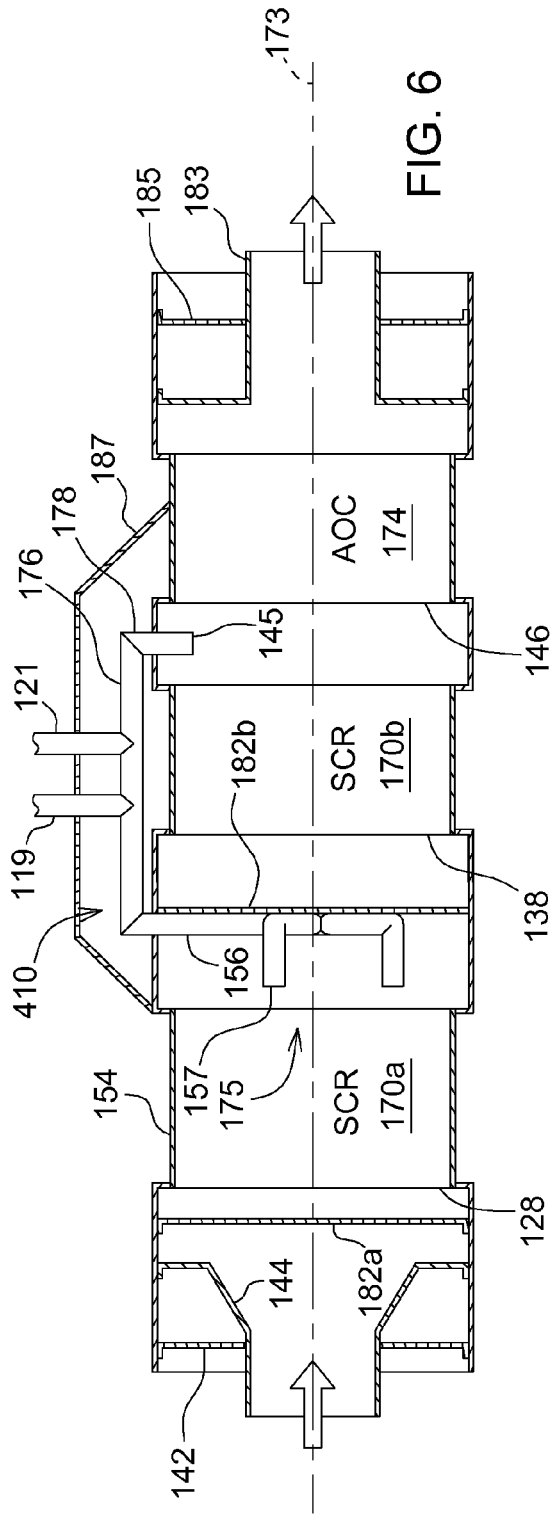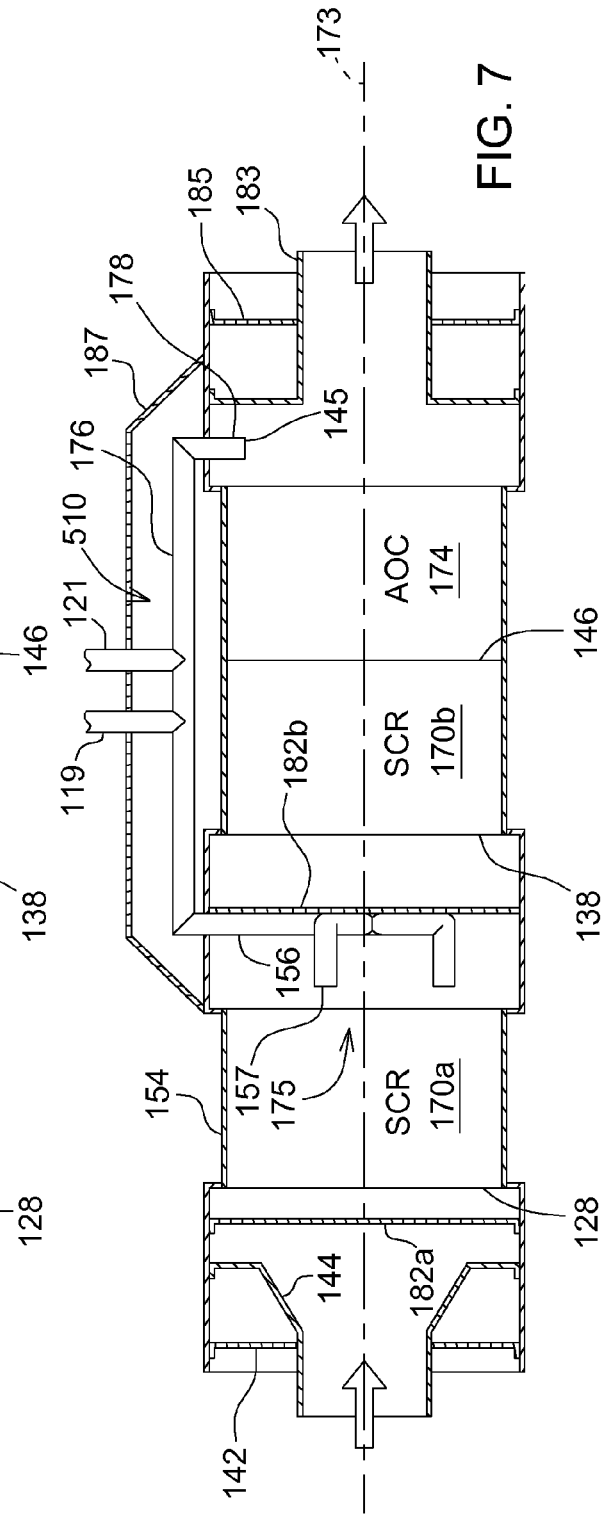

EXHAUST GAS SAMPLING DEVICE

FIELD OF THE DISCLOSURE

The present disclosure relates to an exhaust gas sampling device.

BACKGROUND OF THE DISCLOSURE

In an internal combustion engine, when combustion occurs in an environment with excess oxygen, peak combustion temperatures increase, leading to the formation of unwanted emissions, such as $NO_x$. This may be aggravated in internal combustion engine applications through the use of turbochargers operable to increase the mass of fresh air gas flow, and hence increase the concentrations of oxygen and nitrogen present in the combustion chamber of the engine when the temperature is high during or after a given combustion event.

Conventional $NO_x$ reduction techniques may be implemented, such as including a $NO_x$ emissions filter in-line with the exhaust stream. With such techniques, it is typically useful to determine the $NO_x$ content of the exhaust gas exiting the engine. The $NO_x$ content of the exhaust gas, produced by the engine, may be determined directly with a conventional $NO_x$ sensor. In typical applications, the $NO_x$ sensor is exposed to the exhaust gas to produce a signal that is, hopefully, indicative of the $NO_x$ content of the exhaust gas. In reality, however, the signal may be indicative of an unrepresentative, localized reading, and such readings are often times taken in a harsh environment, resulting in premature sensor failures.

SUMMARY OF THE DISCLOSURE

Disclosed is an exhaust gas sampling device coupled to an aftertreatment system for treating exhaust gas flowing therethrough. The exhaust gas sampling device comprises an inlet passage, an outlet passage, a sensor passage, and a sensor. The inlet passage extracts a portion of the exhaust gas from the aftertreatment system, and the portion of the exhaust gas has a physical property that that is substantially similar to an equivalent physical property of a cross section of the exhaust gas flowing through the aftertreatment system. The sensor passage is positioned fluidly between the inlet passage and the outlet passage, and the sensor is in fluid communication with the sensor passage for providing a signal indicative of a property of the portion of the exhaust gas. The outlet passage reintroduces the portion of the exhaust gas back into the aftertreatment system.

BRIEF DESCRIPTION OF THE DRAWINGS

The detailed description of the drawings refers to the accompanying figures in which:

FIG. 2 is a sectional view of a first embodiment of the exhaust gas sampling device;

FIG. 3 is a sectional view taken along lines 3-3 of FIG. 2 showing the first embodiment of the exhaust gas sampling device;

FIG. 6 is a sectional view of a fourth embodiment of the exhaust gas sampling device; and FIG. 7 is a sectional view of a fifth embodiment of the exhaust gas sampling device.

DETAILED DESCRIPTION OF THE DRAWINGS

Figure 1:
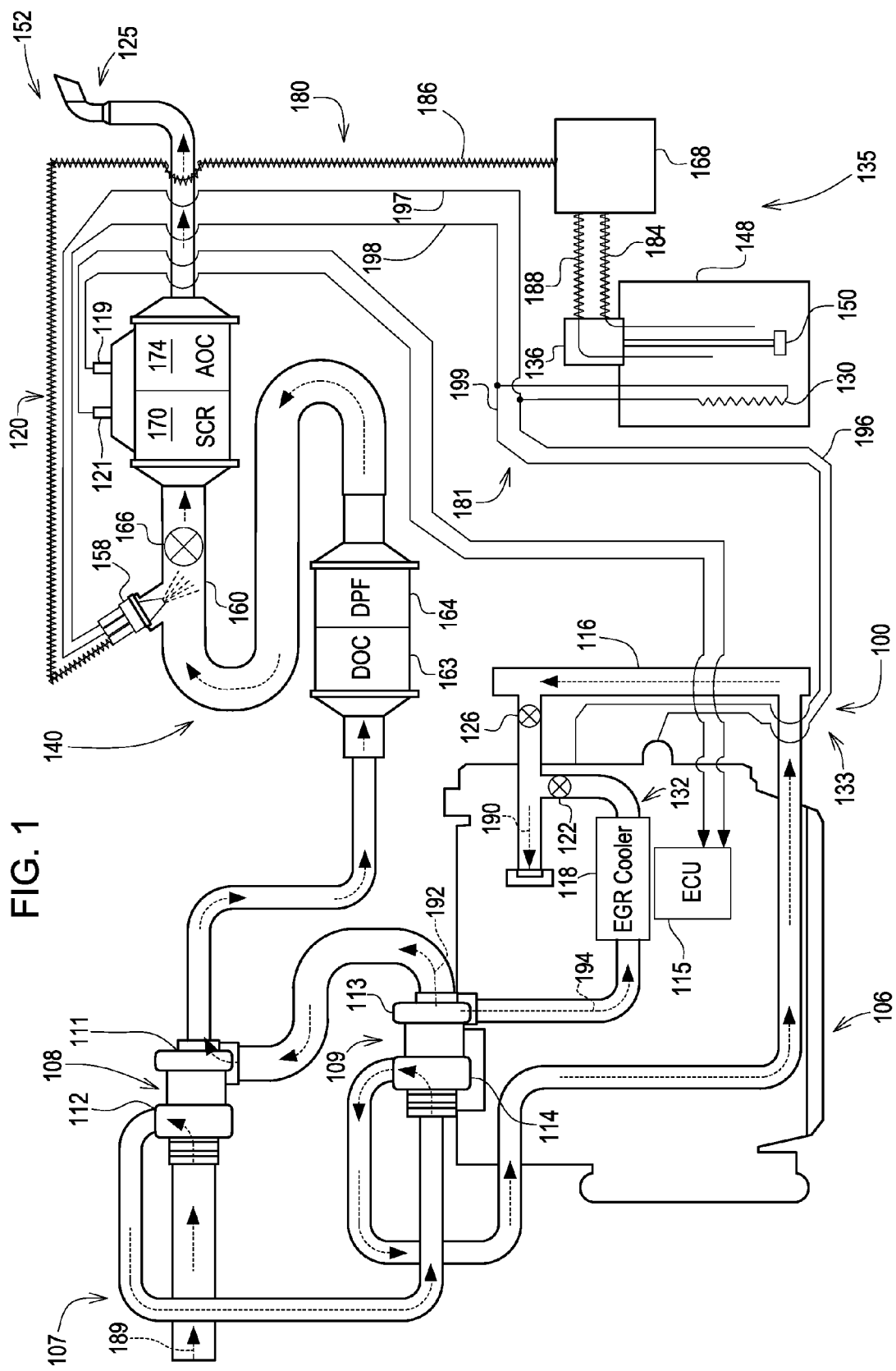
FIG. 1 is a schematic illustration of a power system having a selective catalytic reduction (SCR) catalyst and an ammonia oxidation catalyst (AOC)

Referring to FIG. 1, there is shown a schematic illustration of a power system 100 for providing power to a variety of machines, including on-highway trucks, construction vehicles, marine vessels, stationary generators, automobiles, agricultural vehicles, and recreation vehicles. The engine 106 may be any kind that produces an exhaust gas, as indicated by directional arrow 192. For example, engine 106 may be an internal combustion engine, such as a gasoline engine, a diesel engine, a gaseous fuel burning engine (e.g., natural gas), or any other exhaust gas producing engine. The engine 106 may be of any size, with any number cylinders (not shown), and in any configuration (e.g., "V," inline, and radial). The engine 106 may include various sensors, such as temperature sensors, pressure sensors, and mass flow sensors—some of which are shown in FIG. 1.

The power system 100 may comprise an intake system 107 that includes components for introducing a fresh intake gas, as indicated by directional arrow 189, into the engine 106. Among other things, the intake system 107 may include an intake manifold (not shown) in communication with the cylinders, a compressor 112, a charge air cooler 116, and an air throttle actuator 126.

The compressor 112 may be a fixed geometry compressor, a variable geometry compressor, or any other type of compressor that is capable of receiving the fresh intake gas from upstream of the compressor 112. The compressor 112 compresses the fresh intake gas to an elevated pressure level. As shown, the charge air cooler 116 is positioned downstream of the compressor 112, and it cools the fresh intake gas.

The air throttle actuator 126 may be positioned downstream of the charge air cooler 116, and it may be, for example, a flap type valve controlled by an electronic control unit (ECU) 115 to regulate the air-fuel ratio. The air throttle actuator 126 is open during normal operation and when the engine 106 is off. However, in order to raise the exhaust temperature prior to, and during, active exhaust filter regeneration, the ECU 115 progressively closes the air throttle actuator 126. This creates a restriction, causing the exhaust temperature to increase. The ECU 115 receives position feedback from an internal sensor within the air throttle actuator 126.

Further, the power system 100 includes an exhaust system 140, which has components for directing exhaust gas from the engine 106 to the atmosphere. The exhaust system 140 may include an exhaust manifold (not shown) in fluid communication with the cylinders. During an exhaust stroke, at least one exhaust valve (not shown) opens, allowing the exhaust gas to flow through the exhaust manifold and a turbine 111. The pressure and volume of the exhaust gas drives the turbine 111, allowing it to drive the compressor 112 via a shaft (not shown). The combination of the compressor 112, the shaft, and the turbine 111 is known as a turbocharger 108.

The power system 100 may also have, for example, a second turbocharger 109 that cooperates with the turbocharger 108 (i.e., series turbocharging). The second turbocharger 109 includes a second compressor 114, a second shaft (not shown), and a second turbine 113. The second compressor 114 may be a fixed geometry compressor, a variable geometry compressor, or any other type of compressor capable of receiving fresh intake gas, from upstream of the second compressor 114, and compressing the fresh intake gas to an elevated pressure level before it enters the engine 106.

The power system 100 may also have an EGR system 132 for receiving a recirculated portion of the exhaust gas, as indicated by directional arrow 194. The intake gas is indicated by directional arrow 190, and it is a combination of the fresh intake gas and the recirculated portion of the exhaust gas. The EGR system 132 has an EGR valve 122 and an EGR mixer (not shown). The EGR valve 122 may be a vacuum controlled valve, allowing a specific amount of the recirculated portion of the exhaust gas back into the intake manifold. Although the EGR valve 122 is illustrated as being downstream of EGR cooler 118, it could also be positioned upstream thereof.

As noted above, the EGR mixer mixes the recirculated portion of the exhaust gas and the fresh intake gas, resulting in the formation of the intake gas. The recirculated exhaust gas travels in pulses correlating to the exhaust strokes of the cylinders (not shown) of the engine 106. So, if the engine 106 has, for example, four cylinders, then the recirculated exhaust gas travels in one pulse per every 180° of crank rotation. The fresh intake gas also travels in pulses, but these pulses correlate to, for example, the operation of the turbocharger 108, the second turbocharger 109, and the intake valves (not shown). This results in a flow of the pulses of the fresh intake gas at unique times and frequencies, relative to the pulses of the recirculated exhaust gas. As a result of all of this, the recirculated exhaust gas and fresh intake gas turbulently mix in the EGR mixer.

As further shown, the exhaust system 140 includes an aftertreatment system 120, and at least some of the exhaust gas passes therethrough. The aftertreatment system 120 removes various chemical compounds and particulate emissions present in the exhaust gas received from the engine 106. After being treated by the aftertreatment system 120, the exhaust gas is expelled into the atmosphere via a tailpipe 125.

The aftertreatment system 120 may include a $NO_x$ sensor 119, the $NO_x$ sensor 119 produces and transmits a $NO_x$ signal to the ECU 115, which is indicative of a $NO_x$ content of exhaust gas flowing thereby. Exemplarily, the $NO_x$ sensor 119 may rely upon an electrochemical or catalytic reaction that generates a current, the magnitude of which is indicative of the $NO_x$ concentration of the exhaust gas.

The ECU 115 may have four primary functions: (1) converting analog sensor inputs to digital outputs, (2) performing mathematical computations for all fuel and other systems, (3) performing self diagnostics, and (4) storing information. The ECU 115 may, in response to the $NO_x$ signal, control a combustion temperature of the engine 106 and/or the amount of a reductant injected into the exhaust gas.

The aftertreatment system 120 is shown having a diesel oxidation catalyst (DOC) 163, a diesel particulate filter (DPF) 164, and a selective catalytic reduction (SCR) system 152, though the need for such components depends on the particular size and application of the power system 100. The SCR system 152 has a reductant delivery system 135, an SCR catalyst 170, and an ammonia oxidation catalyst AOC 174. The exhaust gas may flow through the DOC 163, the DPF 164, the SCR catalyst 170, and the AOC 174, and is then, as just mentioned, expel into the atmosphere via the tailpipe 125. Exhaust gas that is treated in the aftertreatment system 120 and released into the atmosphere contains significantly fewer pollutants (e.g., PM, $NO_x$, and hydrocarbons) than an untreated exhaust gas.

The DOC 163 may be configured in a variety of ways and contain catalyst materials useful in collecting, absorbing, adsorbing, and/or converting hydrocarbons, carbon monoxide, and/or oxides of nitrogen contained in the exhaust gas. Such catalyst materials may include, for example, aluminum, platinum, palladium, rhodium, barium, cerium, and/or alkali metals, alkaline-earth metals, rare-earth metals, or combinations thereof. The DOC 163 may include, for example, a ceramic substrate, a metallic mesh, foam, or any other porous material known in the art, and the catalyst materials may be located on, for example, a substrate of the DOC 163. The DOC(s) may also oxidize NO contained in the exhaust gas, thereby converting it to $NO_2$ upstream of the SCR catalyst 170.

The DPF 164 may be any of various particulate filters known in the art that are capable of reducing PM concentrations (e.g., soot and ash) in the exhaust gas, so as to meet requisite emission standards. Any structure capable of removing PM from the exhaust gas of the engine 106 may be used. For example, the DPF 164 may include a wall-flow ceramic substrate having a honeycomb cross-section constructed of cordierite, silicon carbide, or other suitable material to remove the PM. The DPF 164 may be electrically coupled to a controller, such as the ECU 115, that controls various characteristics of the DPF 164.

If the DPF 164 were used alone, it would initially help in meeting the emission requirements, but would quickly fill up with soot and need to be replaced. Therefore, the DPF 164 is combined with the DOC 163, which helps extend the life of the DPF 164 through the process of regeneration. The ECU 115 may measure the PM build up, also known as filter loading, in the DPF 164, using a combination of algorithms and sensors. When filter loading occurs, the ECU 115 manages the initiation and duration of the regeneration process.

Moreover, the reductant delivery system 135 may include a reductant tank 148 for storing the reductant. One example of a reductant is a solution having 32.5% high purity urea and 67.5% deionized water (e.g., DEF), which decomposes as it travels through a decomposition tube 160 to produce ammonia. Such a reductant may begin to freeze at approximately 12 deg F. (−11 deg C.). If the reductant freezes when a machine is shut down, then the reductant may need to be thawed before the SCR system 152 can function.

The reductant delivery system 135 may include a reductant header 136 mounted to the reductant tank 148, the reductant header 136 further including, in some embodiments, a level sensor 150 for measuring a quantity of the reductant in the reductant tank 148. The level sensor 150 may include a float configured to float at a liquid/air surface interface of reductant included within the reductant tank 148. Other implementations of the level sensor 150 are possible, and may include, for example, one or more of the following: (1) using one or more ultrasonic sensors, (2) using one or more optical liquid-surface measurement sensors, (3) using one or more pressure sensors disposed within the reductant tank 148, and (4) using one or more capacitance sensors.

In the illustrated embodiment, the reductant header 136 includes a tank heating element 130 that receives coolant from the engine 106. The power system 100 includes a cooling system 133 having a coolant supply passage 180 and a coolant return passage 181. The cooling system 133 may be an opened system or a closed system, depending on the specific application, while the coolant may be any form of engine coolant, including fresh water, sea water, an antifreeze mixture, and the like.

A first segment 196 of the coolant supply passage 180 is positioned fluidly, between the engine 106 and the tank heating element 130, for supplying coolant to the tank heating element 130. The coolant circulates, through the tank heating element 130, so as to warm the reductant in the reductant tank 148, therefore reducing the risk that the reductant freezes therein and/or thawing the reductant upon startup. In an alternative embodiment, the tank heating element 130 may, instead, be an electrically resistive heating element. A second segment 197 of the coolant supply passage 180 is positioned fluidly between the tank heating element 130 and a reductant delivery mechanism 158 for supplying coolant thereto. The coolant heats the reductant delivery mechanism 158, reducing the risk that reductant freezes therein.

A first segment 198 of the coolant return passage 181 is positioned between the reductant delivery mechanism 158 and the tank heating element 130, and a second segment 199 of the coolant return passage 181 is positioned between the engine 106 and the tank heating element 130. The first segment 198 and the second segment 199 return the coolant to the engine 106.

The decomposition tube 160 may be positioned downstream of the reductant delivery mechanism 158 but upstream of the SCR catalyst 170. The reductant delivery mechanism 158 may be, for example, an injector that is selectively controllable to inject reductant directly into the exhaust gas. As shown, the SCR system 152 may include a reductant mixer 166 that is positioned upstream of the SCR catalyst 170 and downstream of the reductant delivery mechanism 158.

The reductant delivery system 135 may additionally include a reductant pressure source (not shown) and a reductant extraction passage 184. The extraction passage 184 may be coupled fluidly to the reductant tank 148 and the reductant pressure source therebetween. Although the extraction passage 184 is shown extending into the reductant tank 148, in other embodiments, the extraction passage 184 may be coupled to an extraction tube via the reductant header 136. The reductant delivery system 135 may further include a reductant supply module 168, such as a Bosch reductant supply module (e.g., the Bosch Denoxtronic 2.2—Urea Dosing System for SCR Systems).

The reductant delivery system 135 may also include a reductant dosing passage 186 and a reductant return passage 188. The return passage 188 is shown extending into the reductant tank 148, though in some embodiments of the power system 100, the return passage 188 may be coupled to a return tube via the reductant header 136. And the reductant delivery system 135 may have—among other things—valves, orifices, sensors, and pumps positioned in the extraction passage 184, reductant dosing passage 186, and return passage 188.

As mentioned above, one example of a reductant is a solution having 32.5% high purity urea and 67.5% deionized water (e.g., DEF), which decomposes as it travels through the decomposition tube 160 to produce ammonia. The ammonia reacts with $NO_x$ in the presence of the SCR catalyst 170, and it reduces the $NO_x$ to less harmful emissions, such as $N_2$ and $H_2O$. The SCR catalyst 170 may be any of various catalysts known in the art. For example, in some embodiments, the SCR catalyst 170 may be a vanadium-based catalyst. But in other embodiments, the SCR catalyst 170 may be a zeolite-based catalyst, such as a Cu-zeolite or a Fe-zeolite. The AOC 174 may be any of various flowthrough catalysts for reacting with ammonia and thereby produce nitrogen. Generally, the AOC 174 is utilized to remove ammonia that has slipped through or exited the SCR catalyst 170. As shown, the AOC 174 and the SCR catalyst 170 may be positioned within the same housing 154 (as shown in FIGS. 1-7), but in other embodiments, they may be separate from one another. As shown, the housing 154 may form a longitudinal housing axis 173.

As shown in FIG. 2, the exhaust gas sampling device 110 is coupled to the aftertreatment system 120. Upstream of the sampling device 110, there is an inlet cone 144 mounted to the inlet retainer 142 the housing 154. And downstream of the sampling device 110, there is an outlet cone 183 mounted to the outlet retainer 185 and the housing 154. Exemplarily, these components may be made of stainless steel, a material that is highly resistant to corrosion that might otherwise be caused by the aftertreatment process discussed above.

In the embodiment shown in FIG. 2, the SCR catalyst 170 is positioned upstream of an inlet opening 157, followed by the AOC 174, and an outlet opening 145, respectively. The inlet opening 157 is shown being substantially centered about a longitudinal housing axis 173. To more specifically describe FIG. 1, the SCR catalyst 170 comprises a first SCR catalyst 170a and a second SCR catalyst 170b, though other embodiments, depending on the application, could have any number of SCR catalysts. The first SCR catalyst 170a is positioned upstream of the second SCR catalyst 170b, followed by the inlet opening 157, the AOC 174, and the outlet opening 145, respectively.

The inlet passage 175 of the sampling device 110 extracts a portion of the exhaust gas from the aftertreatment system 120. The extracted portion has a physical property (e.g., the $NO_x$ concentration or the $NH_3$ concentration) that is substantially similar to an equivalent physical property of a given cross section of the exhaust gas flowing through the aftertreatment system 120. In contrast, a portion of the exhaust gas positioned adjacent to the periphery of the housing 154 may not, in some cases, be substantially similar to the physical property of the entire cross section of the exhaust gas. Rather, the portion adjacent to the periphery of the housing 154 may have a slightly higher or lower amount of the physical property, resulting in unrepresentative, localized readings.

The inlet passage 175, the outlet passage 178 and the sensor passage 176 may all be formed of stainless steel conduits coupled together via welds. As shown, the inlet passage 175 and the outlet passage 178 are at least partially positioned inside of the aftertreatment system 120, and the sensor passage 176 is positioned outside of the aftertreatment system 120 but inside of a protective housing 187. In other embodiments, the sensor passage 176 may be positioned inside of the housing 154.

The sensor passage 176 is positioned fluidly between the inlet passage 175 and the outlet passage 178, and the sensor 119 is in fluid communication with the sensor passage 176 for providing a signal indicative of a property of the portion of the exhaust gas, as discussed above. The outlet passage 178 reintroduces the portion of the exhaust gas back into the aftertreatment system 120, and the portion of the exhaust gas exits into the atmosphere.

The $NO_x$ sensor 119 provides a signal indicative of a $NO_x$ level in the exhaust gas, and an $NH_3$ sensor 121 for providing a second signal indicative of an $NH_3$ level of the exhaust gas. The sensors 119, 121 may be at least partially positioned within a protective housing 187 made of, for example, stainless steel that is joined to the housing 154. The sensors 119, 121 may protrude through the protective housing 187, so that wiring harnesses (not shown) can be connected thereto for communicating the signals to the ECU 115. As shown, by using the sampling device 110, the sensors 119, 121 can be positioned away from the housing 154, thereby reducing the temperature of their environment.

In operation, a mixing plate 182a mixes the exhaust gas, so that it is evenly distributed, across a first SCR catalyst face 128, prior to flowing through the first SCR catalyst 170a. Likewise, a mixing plate 182b further mixes the exhaust gas, so that it is evenly distributed, across an AOC catalyst face 146, prior to flowing across the AOC 174. In such an embodiment, the inlet passage 175 is coupled to the mixing plate 182b, although in other embodiments, the inlet passage 175 may be coupled to, for example, the housing 154, the protective housing 187, or another part of the aftertreatment system 120.

A pressure of the exhaust gas flowing through the aftertreatment system 120 is higher upstream of the inlet passage 175 than a pressure downstream of the inlet passage 175. The higher and lower pressures may be created by an obstruction, such as mixing plate 182b, positioned downstream of the inlet passage 175, but upstream of the outlet passage 178. The higher pressure forces the portion of the exhaust gas from the aftertreatment system 120 into the inlet passage 175.

Next, referring to FIG. 3, the inlet opening 157 cooperates with an inlet opening 165 and an inlet opening 172, wherein the inlet openings 157, 165, 172—shown being suspended by an inlet passage post 156—each receive a component of the exhaust gas so as to form the portion of the exhaust gas. The inlet openings 157, 165, and 172 are each shown as having a bend, so that each can be both mounted to the inlet passage post 156, but also be positioned so as to receive exhaust gas. The combination of the components of the exhaust gas join and form a representative sample of the exhaust gas flowing through the aftertreatment system 120. As shown, the inlet passage post 156 may be mounted substantially vertically, but in other embodiments, the inlet passage post 156 may positioned at various different angles and be constructed out of one or more pieces.

Figure 4:
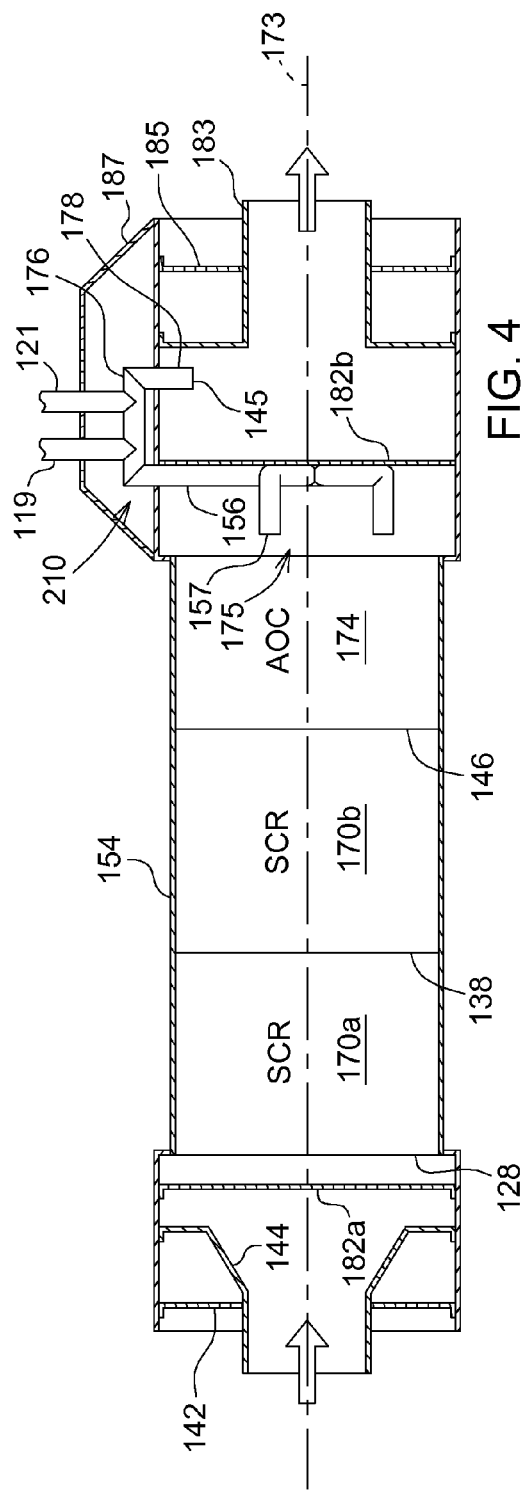
FIG. 4 is a sectional view of a second embodiment of the exhaust gas sampling device.

Referring to FIG. 4, there is shown a sectional view of a second embodiment of the exhaust gas sampling device 210. The sampling device 210 has several components similar in structure and function as the sampling device 110 (as well as the others discussed below), as indicated by the use of identical reference numerals where applicable. In this embodiment, the first SCR catalyst 170a is positioned upstream of the second SCR catalyst 170b, followed by the AOC 174, the inlet opening 157, and the outlet opening 145. In operation, the mixing plate 182a mixes the exhaust gas so that it is evenly distributed, across the first SCR catalyst face 128, prior to flowing through the first SCR catalyst 170a and the second SCR catalyst 170b. The inlet passage 175 is coupled to the mixing plate 182b.

Figure 5:
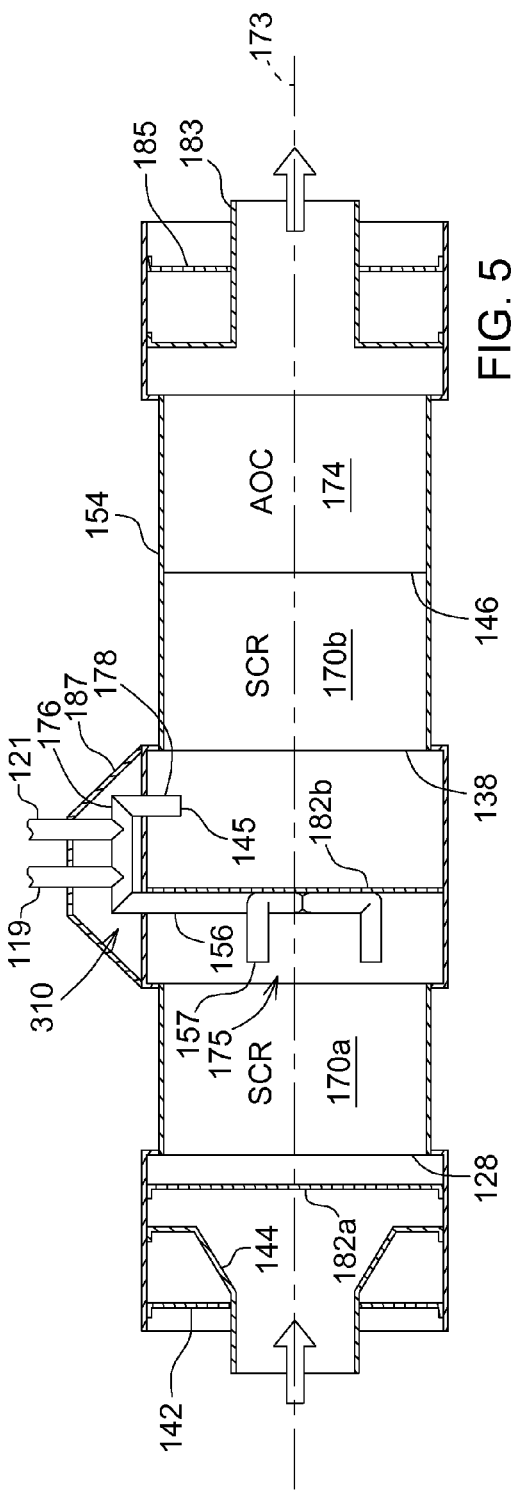
FIG. 5 is a sectional view of a third embodiment of the exhaust gas sampling device.

Next, in FIG. 5, there is shown a sectional view of a third embodiment of the exhaust gas sampling device 310. In this embodiment, the first SCR catalyst 170a is positioned upstream of the inlet opening 157, followed by the outlet opening 145, the second SCR catalyst 170b, and the AOC 174, respectively. And, as shown, the mixing plate 182a mixes the exhaust gas so that it is evenly distributed, across the first SCR catalyst face 128, prior to flowing through the first SCR catalyst 170a. The inlet passage 175 may be coupled to the mixing plate 182b. The mixing plate 182b mixes the exhaust gas so that it is evenly distributed, across a second SCR catalyst face 138, prior to flowing through the second SCR catalyst 170b.

Referring to FIG. 6, there is shown a sectional view of a fourth embodiment of the exhaust gas sampling device 410. As shown, the first SCR catalyst 170a is positioned upstream of the inlet opening 157, followed by the second SCR catalyst 170b, the outlet opening 145, and the AOC 174. Additionally, in operation, the mixing plate 182a mixes the exhaust gas so that it is evenly distributed, across a first SCR catalyst face 128, prior to flowing through the first SCR catalyst 170a. Additionally, the mixing plate 182b mixes the exhaust gas so that it is even distributed, across the second SCR catalyst face 138, prior to flowing through the second SCR catalyst 170b and the AOC 174. The inlet passage 175 may be coupled to the mixing plate 182b.

Finally, referring to FIG. 7, there is shown a sectional view of a fifth embodiment of the exhaust gas sampling device 510. In this embodiment, the SCR catalyst 170 is positioned upstream of the inlet opening 157, followed by the second SCR catalyst 170b, the AOC 174, and the outlet opening 145, respectively. In operation, the mixing plate 182a mixes the exhaust gas so that it is evenly distributed, across the first SCR catalyst face 128, prior to flowing through the first SCR catalyst 170a. Further, the mixing plate 182b mixes the exhaust gas so that it is even distributed, across the second SCR catalyst face 138, prior to flowing through the second SCR catalyst 170b and the AOC 174. In this embodiment, the inlet passage 175 is coupled to the mixing plate 182b.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An exhaust gas sampling device coupled to an aftertreatment system, the aftertreatment system configured to treat exhaust gas flowing therethrough, the exhaust gas sampling device comprising:
   an inlet passage configured to extract a portion of the exhaust gas from the aftertreatment system, a physical property of the portion of the exhaust gas is substantially similar to an equivalent physical property of a cross section of the exhaust gas flowing through the aftertreatment system;
   an outlet passage being configured to reintroduce the portion of the exhaust gas back into the aftertreatment system; and
   a sensor passage and a $NO_x$ sensor, the sensor passage being positioned fluidly between the inlet passage and the outlet passage, the sensor being in fluid communication with the sensor passage and configured to provide a signal indicative of a $NO_x$ level in the exhaust gas.

2. The exhaust gas sampling device of claim 1, wherein the aftertreatment system comprises a selective catalytic reduction (SCR) catalyst and an ammonia oxidation catalyst (AOC), the SCR catalyst is positioned upstream of an inlet opening of the inlet passage, the inlet opening of the inlet passage is positioned upstream of an outlet of the outlet passage, and the outlet opening of the outlet passage is positioned upstream of the AOC.

3. The exhaust gas sampling device of claim 1, wherein the aftertreatment system comprises a selective catalytic reduction (SCR) catalyst and an ammonia oxidation catalyst (AOC), the SCR catalyst is positioned upstream of an inlet opening of the inlet passage, the inlet opening of the inlet passage is positioned upstream of the AOC, and the AOC is positioned upstream of an outlet opening of the outlet passage.

4. The exhaust gas sampling device of claim 1, wherein the aftertreatment system comprises a selective catalytic reduction (SCR) catalyst and an ammonia oxidation catalyst (AOC), the SCR catalyst is positioned upstream of the AOC, the AOC is positioned upstream of an inlet opening of the inlet passage, and the inlet opening of the inlet passage is positioned upstream of an outlet opening of the outlet passage.

5. The exhaust gas sampling device of claim 1, wherein the aftertreatment system comprises a first selective catalytic reduction (SCR) catalyst, a second SCR catalyst, and an ammonia oxidation catalyst (AOC), the first SCR catalyst is positioned upstream an inlet opening of the inlet passage, the inlet opening of the inlet passage is positioned upstream of an outlet opening of the outlet passage, the outlet opening of the outlet passage is positioned upstream of the second SCR catalyst, and the second SCR catalyst is positioned upstream of the AOC.

6. The exhaust gas sampling device of claim 1, wherein the aftertreatment system comprises a first selective catalytic reduction (SCR) catalyst, a second SCR catalyst, and an ammonia oxidation catalyst (AOC), the first SCR catalyst is positioned upstream of an inlet opening of the inlet passage, the inlet opening of the inlet passage is positioned upstream of the second SCR catalyst, the second SCR catalyst is positioned upstream of an outlet opening of the outlet passage, and the outlet opening of the outlet passage is positioned upstream of the AOC.

7. The exhaust gas sampling device of claim 1, wherein the aftertreatment system comprises a first selective catalytic reduction (SCR) catalyst, a second SCR catalyst, and an ammonia oxidation catalyst (AOC), the first SCR catalyst is positioned upstream of an inlet opening the inlet passage, the inlet opening of the inlet passage is positioned upstream of the second SCR catalyst, the second SCR catalyst is positioned upstream of the AOC, and the AOC is positioned upstream of an outlet opening of the outlet passage.

8. The exhaust gas sampling device of claim 1, wherein the aftertreatment system comprises a first selective catalytic reduction (SCR) catalyst, a second SCR catalyst, and an ammonia oxidation catalyst (AOC), the first SCR catalyst is positioned upstream of the second SCR catalyst, the second SCR catalyst is positioned upstream of an inlet opening of the inlet passage, the inlet opening of the inlet passage is positioned upstream of an outlet opening of the outlet passage, and the outlet opening of the outlet passage is positioned upstream of the AOC.

9. The exhaust gas sampling device of claim 1, wherein the aftertreatment system comprises a first selective catalytic reduction (SCR) catalyst, a second SCR catalyst, and an ammonia oxidation catalyst (AOC), the first SCR catalyst is positioned upstream of the second SCR catalyst, the second SCR catalyst is positioned upstream of the AOC, the AOC is positioned upstream of an inlet opening of the inlet passage, and the inlet opening of the inlet passage is positioned upstream of an outlet opening of the outlet passage.

10. The exhaust gas sampling device of claim 1, wherein the aftertreatment system comprises a first selective catalytic reduction (SCR) catalyst, a second SCR catalyst, and an ammonia oxidation catalyst (AOC), the first SCR catalyst is positioned upstream of the second SCR catalyst, the second SCR catalyst is positioned upstream of an inlet opening of the inlet passage, the inlet opening of the inlet passage is positioned upstream of the AOC, and the AOC is positioned upstream of an outlet opening of the outlet passage.

11. The exhaust gas sampling device of claim 1, wherein the inlet passage, the outlet passage and the sensor passage are formed of stainless steel conduits coupled together via welds, the inlet passage and the outlet passage are at least partially positioned inside of the aftertreatment system, and the sensor passage is positioned outside of the aftertreatment system but inside of a protector.

12. The exhaust gas sampling device of claim 1, wherein the aftertreatment system comprises a selective catalytic reduction (SCR) catalyst and a mixing plate, the mixing plate is configured to mix the exhaust gas so that the exhaust gas is evenly distributed when flowing across the SCR catalyst, and the inlet passage is coupled to thereto.

13. The exhaust gas sampling device of claim 1, wherein the aftertreatment system comprises an ammonia oxidation catalyst (AOC) and a mixing plate, the mixing plate is configured to mix the exhaust gas so that the exhaust gas is evenly distributed when flowing across the AOC, and the inlet passage is coupled to the mixing plate.

14. The exhaust gas sampling device of claim 1, further comprising an $NH_3$ sensor, the $NH_3$ sensor being coupled to the sensor passage and configured to provide a second signal indicative of an $NH_3$ level of the exhaust gas.

15. The exhaust gas sampling device of claim 1, wherein a pressure of the exhaust gas flowing through the aftertreatment system is higher upstream of the inlet passage than a pressure downstream of the inlet passage, the higher and lower pressures are created by an obstruction that is positioned downstream of the inlet passage but upstream of the outlet passage, the higher pressure forces the portion of the exhaust gas from the aftertreatment system into the inlet passage.

16. The exhaust gas sampling device of claim 15, wherein the obstruction is a mixing plate.

17. The exhaust gas sampling device of claim 1, wherein an inlet opening of the inlet passage is substantially centered about a longitudinal housing axis.

18. The exhaust gas sampling device of claim 17, wherein the inlet opening is one of a plurality of inlet openings, and the plurality of inlet openings is configured to each receive a component of the exhaust gas so as to form the portion of the exhaust gas.

19. The exhaust gas sampling device of claim 18, wherein the plurality of inlet portions extends substantially in a radial direction.

* * * * *